(12) United States Patent
Dorronsoro Díaz et al.

(10) Patent No.: US 11,300,479 B2
(45) Date of Patent: Apr. 12, 2022

(54) DEVICE FOR DETERMINING THE OPTICAL POWER OF LENSES AND MEASUREMENT METHOD

(71) Applicants: CONSEJO SUPERIOR DE INVESTIGACIONES CIENTÍFICAS, Madrid (ES); 2EYES VISION S.L., Madrid (ES)

(72) Inventors: Carlos Dorronsoro Díaz, Madrid (ES); Enrique Gambra Urralburu, Madrid (ES); Xoana Barcala Gosende, Madrid (ES); Victor Rodríguez López, Madrid (ES); Susana Marcos Celestino, Madrid (ES)

(73) Assignees: CONSEJO SUPERIOR DE INVESTIGACIONES CIENTÍFICAS, Madrid (ES); 2EYES VISION S.L., Madrid (ES)

( * ) Notice: Subject to any disclaimer, the term of this patent is extended or adjusted under 35 U.S.C. 154(b) by 0 days.

(21) Appl. No.: 16/627,714

(22) PCT Filed: Jun. 28, 2018

(86) PCT No.: PCT/ES2018/070464
§ 371 (c)(1),
(2) Date: Dec. 30, 2019

(87) PCT Pub. No.: WO2019/002656
PCT Pub. Date: Jan. 3, 2019

(65) Prior Publication Data
US 2021/0148785 A1 May 20, 2021

(30) Foreign Application Priority Data
Jun. 28, 2017 (ES) .................. P201730854

(51) Int. Cl.
*G01M 11/02* (2006.01)

(52) U.S. Cl.
CPC .... *G01M 11/0228* (2013.01); *G01M 11/0257* (2013.01)

(58) Field of Classification Search
CPC ... G01B 11/255; G01B 11/2441; G06T 7/521; G06T 2207/30108; G01M 11/0257; G01M 11/0242; G01M 11/0235; G01M 11/0228
(Continued)

(56) References Cited

U.S. PATENT DOCUMENTS 3,136,839 A    6/1964  Safir
3,870,415 A *  3/1975  Cornsweet ......... G01M 11/0235
                                                    356/124

(Continued)

FOREIGN PATENT DOCUMENTS

EP    0366357 A2   5/1990
EP    1832930 A2   9/2007
(Continued)

OTHER PUBLICATIONS

International Search Report dated Jan. 14, 2019 re: Application No. PCT/ES2018/070464, pp. 1-2, citing: US 2010/0060883 A1, EP 1832930 A2, U.S. Pat. No. 4,580,043 A and JPS59146009 A.

*Primary Examiner* — Isiaka O Akanbi
(74) *Attorney, Agent, or Firm* — Cantor Colburn LLP (57) ABSTRACT

A device for measuring the optical power of an optical test system includes an optical-object-generating assembly, a support for the optical test system, a digital image detector, and a deflector assembly. The deflector assembly is intended to generate a lateral movement in respect of the initial optical image, thereby producing a shifted optical image and a reference optical image. The digital image detector captures the shifted optical image and the reference optical image in at least one digital image containing data relating to the lateral movement. The device also includes a pro- (Continued)

cessing component to calculate the optical power of the optical test system from the data relating to the lateral movement.

21 Claims, 5 Drawing Sheets

(58) Field of Classification Search
USPC ......... 356/124–125, 128, 625, 445, 611–612
See application file for complete search history.

(56) References Cited

U.S. PATENT DOCUMENTS

| | | | | |
|---|---|---|---|---|
| 4,090,790 | A * | 5/1978 | Dragon | G01M 11/0228 356/125 |
| 4,410,268 | A * | 10/1983 | Tamaki | G01M 11/0235 356/124 |
| 4,580,043 | A | 4/1986 | Imai | |
| 4,601,575 | A * | 7/1986 | Tamaki | G01M 11/0235 356/124 |
| 4,637,720 | A * | 1/1987 | Shirayanagi | G01M 11/0228 356/124 |
| 4,826,315 | A * | 5/1989 | Kohayakawa | G01M 11/0228 356/125 |
| 5,059,022 | A * | 10/1991 | Ookawa | G01B 11/255 356/124 |
| 5,198,867 | A * | 3/1993 | Campbell | G01B 11/255 356/125 |
| 2005/0162641 | A1* | 7/2005 | Yanagi | G01M 11/0228 356/124 |
| 2010/0060883 | A1 | 3/2010 | Heiden | |
| 2015/0098078 | A1* | 4/2015 | Stanley | G01N 9/00 356/124 |

FOREIGN PATENT DOCUMENTS

| | | |
|---|---|---|
| GB | 1490215 A | 10/1977 |
| JP | S593238 A | 1/1984 |
| JP | S59146009 A | 8/1984 |

* cited by examiner

DEVICE FOR DETERMINING THE OPTICAL POWER OF LENSES AND MEASUREMENT METHOD

TECHNICAL FIELD

This disclosure pertains to the technical field of optics and, more particularly, to devices for measuring the optical power of lenses.

BACKGROUND

There are numerous ways to measure the optical power of a lens. One of them is to use the change in spacing between optical elements, but it has the disadvantage that moving parts are used, limiting the robustness of the device and the speed of measurement.

Moreover, opto-adjustable lenses have been developed in recent years, which vary the optical power thereof in response to an electrical signal. These lenses can come from different technologies, and are already used in numerous applications, in some of them with rapid and periodic variations of optical power. In some of these lenses, such as the one disclosed in WO 2012/055049, the change in optical power occurs at a very high speed in response to an electrical impulse, without implying a high price. This has allowed new applications in which the lens works with rapid and periodic variations of optical power. However, opto-adjustable lenses suffer from dynamic effects, deviations from static optical power when the lenses are used in a dynamic cycle, with response times that can range from fractions of milliseconds to minutes. Due to these dynamic effects, the optical power of the lens is not perfectly controlled by the electrical signal. The transient optical power for a given transient electrical value may be less than or greater than the optical power obtained for long-term steady states. The lens response may suffer distortions: delays in rise or fall times, overruns due to late braking or oscillations. These dynamic effects greatly depend on the work cycle, both of the amplitude of the optical power steps required of the lens and of the frequency of the variations.

Methods fast enough to observe the dynamic effects that occur in opto-adjustable lenses are known, such as measuring the intensity at the centre of a laser beam with a small photodiode (Berge, B., & Peseux, J. (2000). Variable focal lens controlled by an external voltage: An application of electrowetting. The European Physical Journal E, 3(2), 159-163) or with a fibre (Annibale, P., Dvornikov, A., & Gratton, E. (2015). Electrically tunable lens speeds up 3D orbital tracking. Biomedical optics express, 6(6), 2181-2190); however, the measurement obtained depends on the image quality, and in particular the blurring induced by the defocussing of the lens itself, and not only the optical power. They are also very sensitive to offsets. Other methods described are to capture the image of an object through the lens with a high-speed camera (Oku, H., & Ishikawa, M. (2009). High-speed liquid lens with 2 ms response and 80.3 nm root-mean-square wavefront error. Applied Physics Letters, 94(22), 221108), but they do not provide data to immediately calculate the optical power of the lens.

There are also methods based on aberrometry that can be used to accurately calculate optical power and optical quality. Although these techniques are usually not fast enough for dynamic measurements of opto-adjustable lenses, there are implementations that could become so, such as those described in Jarosz, J., Mecê, P., Conan, J. M., Petit, C., Paques, M., & Meimon, S. (2017). High temporal resolution aberrometry in a 50-eye population and implications for adaptive optics error budget. Biomedical Optics Express, 8(4), 2088-2105. In any case, aberrometry-based techniques are sophisticated techniques that provide indirect measurements of optical power, with high complexity optical assemblies and high computational and economic cost.

Given the foregoing, there is a need for an achievable optical instrument, for the high speed measurement of lenses, with which the optical power thereof can be evaluated, characterised and checked. In the case of opto-adjustable lenses, whose optical power depends on the electrical input signal, there is also a need to calibrate the static and dynamic optical power thereof. For the purposes of this patent, "high speed" is understood as the operating modes of the opto-adjustable lens or of the cameras with frequencies much higher than the critical flicker-fusion frequency of the human visual system, that is, with frequencies equal to or higher than 50 Hz. In these modes, the visual system perceives a static image through the system even though the lens is oscillating between two or more foci. On the contrary, "low speed" is understood as the operating modes of the opto-adjustable lens or of the cameras with frequencies below that frequency.

A robust, simple, direct system is needed, one without moving parts and with a low cost, to the extent possible, in order to measure the optical power of lenses. Ideally, it should have a high capture speed and be able to be used from t checking the correct operation of opto-adjustable lenses, to the detailed characterisation and calibration thereof, as well as establishing the features thereof and guiding the design of devices based on them.

SUMMARY

These problems are solved by means of a device and a method for determining the optical power of an optical test system according to claims 1 and 14, respectively. The dependent claims define preferred embodiments of the disclosure.

In a first inventive aspect, the disclosure provides a device for determining the optical power of an optical test system, the device comprising an optical object generator assembly for generating an optical object along an optical axis;

a support for the optical test system, such that when the optical test system is located on the support, said optical test system is aligned with the optical axis, and when the optical object is generated, the optical test system projects an initial optical image of the optical object;

a digital image detector;

a deflector assembly located between the optical object generator assembly and the digital image detector, intended to produce a lateral displacement in the initial optical image, thus generating a displaced optical image and a reference optical image, the digital image detector being located to capture the displaced optical image and the reference optical image in at least one digital image containing data on the lateral displacement; and processing means for determining the optical power of the optical test system from the lateral displacement data contained in the digital image.

In different embodiments, the optical test system may comprise a lens (such as an opto-adjustable lens), a composite lens, an optical system such as an objective or prismatic type system, or an optical instrument.

The fact that the deflector assembly produces a lateral displacement in the initial optical image does not require it to be located in any particular position, but it can be in any position between the optical object generator assembly and the digital image detector.

The main advantage of this device is that it enables the optical power of the optical test system to be obtained by a simple and robust procedure, with low sensitivity to positioning errors, since it does not have parts that move between them, which introduce additional steps in the measuring processes, lengthening them and preventing their use for large quantities of lenses in series, and which they also require monitoring of the positioning tolerances and constantly calibrating the spacing between the elements. Since the device is capable of capturing both a displaced optical image and a reference optical image, in order to calculate the lateral displacement in a relative way, the device also has low sensitivity to measurement errors from mismatches, vibrations, offsets and misalignments, even those introduced by the optical test system itself.

In some particular embodiments, the optical object generator assembly includes a light source that illuminates a perforated mask or a lithograph illustrated in a transparent sheet from behind. However, in other embodiments, the optical object can be self-illuminated, such as an object generated on a monitor or a microdisplay, or even an LED. In other embodiments, it can even be a printed and illuminated image. In some particular embodiments, the optical object is in the form of an optical line or slit, and in others, a dot. Single or multiple objects are possible. In general, virtually any object is valid, provided it is known. The processing means have been programmed knowing the optical object, so that the lateral displacement thereof can be easily calculated.

In some embodiments, the optical object generator assembly is configured to generate the optical object in a pulsed manner over time. In these embodiments, the digital image detector can advantageously comprise a conventional low-speed camera (which can have a capture frequency of less than 50 Hz, or less than 30 Hz), which is synchronised with the optical object generator assembly. The optical object generator assembly may comprise a pulsed light source.

In certain embodiments, the capture frequency of the digital image detector is equal to the pulse generation frequency of the optical object generator. Thus, no pulses of light are emitted that are not captured by the digital image detector.

In other embodiments, the pulse generation frequency and the capture frequency are multiples or fractions, that is, there may be two or more pulses for each capture of the digital image detector. To do this, the pulses generated by the optical object generator over time are temporarily discernible by the digital image detector thanks to some characteristic property of the pulse, such as the intensity of each pulse.

In some particular embodiments, the support comprises a reel, an assembly line, a revolver or a drum with a plurality of individual supports, the support being adapted to be positioned in a plurality of different positions, such that in each of these positions an individual support is located such that when an optical test system is located on the individual support, it is aligned with the optical axis.

These embodiments are used when it is intended to evaluate a series of optical test systems at high speed. The support comprises a plurality of individual supports, and it moves between several positions such that, in each position, one of the individual supports, which will support an optical test system, is in the measuring position of the device, that is, aligned with the optical axis. In these embodiments, the only moving part is the support of the device, while the measuring device is fixed, and the corresponding images are taken for each optical test system.

In some particular embodiments, the deflector assembly comprises a single deflector element from among the following: a prism, a mirror, a partially reflective surface, a diffraction grating, a spatial light modulator, a network of microprisms and a network of micromirrors. These elements are especially suitable for causing the lateral displacement of the initial optical image of the optical object.

In some particular embodiments, the only deflector element is arranged to produce a lateral displacement only in part of the initial optical image. This embodiment allows data on the displaced optical image and the reference optical image to be obtained simultaneously in one same digital image.

In some particular embodiments, the deflector assembly comprises several deflector elements. This embodiment enables two or more displaced optical images to be obtained with displacements that can be in opposite directions, which are at the same time a reference image of each other, increasing the accuracy of the measurement and increasing the tolerance to vibrations and positioning errors.

In some particular embodiments, one of the deflector elements is arranged to receive only part of the initial optical image, while another of the deflector elements is arranged to receive a different part of the initial optical image. This embodiment therefore also enables data on the displaced optical image and the reference optical image to be obtained in one same digital image, but in a different way.

In some particular embodiments, the digital image detector has a capture rate greater than 120 images per second, and it can be greater than 500 images per second, thus being able to obtain successive measures of time-discriminated optical power that enable a temporal dynamic response curve for opto-adjustable lenses to be obtained.

In some particular embodiments, the optical test system operates with a frequency of optical power change, and the digital image detector has a capture frequency lower than the frequency of optical power change of the optical test system. In some embodiments, the digital image detector has a capture frequency more than 5 times lower than the frequency of optical power change of the optical test system.

This device achieves the main technical effect of obtaining the dynamic optical power of an optical test system, but with a low cost.

In some particular embodiments, the device further comprises a calibration system between the optical object generator assembly and the support for the optical test system, said calibration system comprising a collimating calibration lens, a focusing calibration lens and a main calibration lens located between them in a plane optically conjugated with the plane of the support for the optical test system.

The calibration system enables calculating a reference relationship between optical power and lateral displacement captured by the digital image detector. The calibration system can be used when there is no optical test system located in the support, to calibrate the device and to verify that a calibration system, whose optical power is previously known, projects a reference optical image and a displaced optical image according to the optical power thereof.

In addition, this calibration system can be used together with the optical test system, and can thus be used to add or subtract dioptres. The optical power of the optical test system can be measured or calibrated as that which compensates for an optical power of the opposite sign in the calibration system, it being understood that it completely compensates for the lateral displacement induced by the calibration system. It can also be used to change the range in which the optical power measurements are made (if the power of the optical test system is too high or too low), thus expanding the possibilities of the system.

In some particular embodiments, the device further comprises optical elements, such as a collimating lens or a focusing lens, located on both sides of the optical test system and contributing to configure the projection parameters of the optical object in the initial optical image, depending on the features of the optical test system.

This device enables any optical power of the optical test system, positive or negative, to be measured since the collimating lens and the focusing lens contribute to complementing the optical power of the test system, such that it can be measured more clearly by the measuring device.

In a second inventive aspect, the disclosure provides a method for measuring the optical power of an optical test system; the method comprising:

generating an optical object by means of an optical object generator assembly;

projecting an initial optical image of the optical object by arranging the optical test system on a support;

producing a lateral displacement in the initial optical image by means of a deflector assembly, generating a displaced optical image and a reference optical image;

capturing by means of a digital image detector at least one digital image containing data on the lateral displacement of the displaced optical image and on the reference optical image; and calculating by means of processing means the optical power of the optical test system from the data on the lateral displacement of the displaced optical image and the reference optical image.

This method enables the optical power of an optical test system to be measured in an easy, fast and robust way, with low sensitivity to external conditions and the quality of its components.

The method can be performed by a device according to the inventive aspect defined above, or in any of the embodiments of this device.

The fact of generating a reference optical image provides additional insensitivity to misalignments and offsets of the optical test system and cancels the effect of vibrations in the system, since both the reference optical image and the displaced optical image would suffer the same effects against misalignments, offsets and vibrations.

In some embodiments, the step of generating an optical object comprises generating an optical object in a pulsed manner overtime. In these embodiments, the step of capturing at least one digital image can be done with a low-speed camera that is synchronised with the optical object generator assembly.

The method enables the dynamic optical power of an opto-adjustable lens to be measured even with a digital image detector that has a capture frequency lower than the frequency of optical power change of the opto-adjustable lens periodically oscillating between various powers and, therefore, at the frequency of lateral displacement of the displaced optical image. This is because the dynamic optical power is obtained from the processing of the displaced optical image captured in the digital image, from the pixels defined by the extreme values of said lateral displacement variation, and from the energy integrated in each intermediate optical power between said extreme values. These data are captured with the system object of the disclosure in conventional low-speed digital images.

In some particular embodiments, the method further comprises the step of calibrating the device by measuring or compensating the optical power induced by an optical test system for calibration.

This method enables the device to be calibrated when it has been subjected to conditions that make it doubt its accuracy, such as transfers, movements, etc.

In some particular embodiments, the step of calculating the optical power of the optical test system comprises identifying a first group of pixels corresponding to the displaced optical image and a second group of pixels corresponding to the reference optical image, measuring the lateral displacement that separates both groups of pixels and correlating the lateral displacement with a measurement table that assigns an optical power value to each lateral displacement value.

This method enables the optical power to be measured in a reliable and robust way, without being affected by displacements or misalignments of the components of the device.

In some particular embodiments, the optical test system comprises an opto-adjustable lens. In some particular embodiments, the steps of capturing the reference signal and the diverted signal are performed several times, the optical test system being subjected to a variable electrical signal, thus obtaining a relationship between the electrical signal supplied to the optical test system and the optical power that said optical test system provides for said electrical signal.

Advantageously, this method is applicable to the device of the disclosure, both in static mode, when the opto-adjustable lens alternates between several stable positions, and in dynamic mode, when the opto-adjustable lens alternates at high speed between different optical powers, and can do so even with low-speed digital image detectors since dynamic optical power can be measured even if the opto-adjustable lens varies its magnitude with a frequency much higher than the capture speed of the digital image detector.

In some particular embodiments, the support comprises a reel, an assembly line, a revolver or a drum with a plurality of individual supports, the support being adapted to be positioned in a plurality of different positions, such that in each of these positions an individual support is located such that when an optical test system is located on the individual support, it is aligned with the optical axis, and the method includes the step of arranging a plurality of lenses in the support, capturing data of the displaced optical image and data of the reference optical image for each of the lenses, thus allowing the lenses to be checked, characterised and/or selected.

This embodiment is used when trying to evaluate a series of lenses, which can be measured at high speed. The support comprises a plurality of individual supports, and it moves such that in each position, one of the individual supports, which will support a lens, is in the measuring position of the device. The only moving part would be the support, while the measuring device is fixed, and the corresponding images are taken for each lens.

The different aspects and particular embodiments of the disclosure defined in the preceding paragraphs can be combined with each other, including features of the device and method, as long as they are compatible with each other.

These and other advantages of the disclosure will become apparent in the light of the detailed description of the same.

BRIEF DESCRIPTION OF THE DRAWINGS

To complete the description, and for the purpose of helping to make the disclosure more readily understandable, the following set of figures is provided. Said figures are an integral part of the description and illustrate one or several particular examples, which must not be interpreted as limiting the scope of protection of the disclosure, but simply as an example of how the disclosure can be carried out. This set includes the following figures.

DETAILED DESCRIPTION OF THE DRAWINGS

Figure 1:
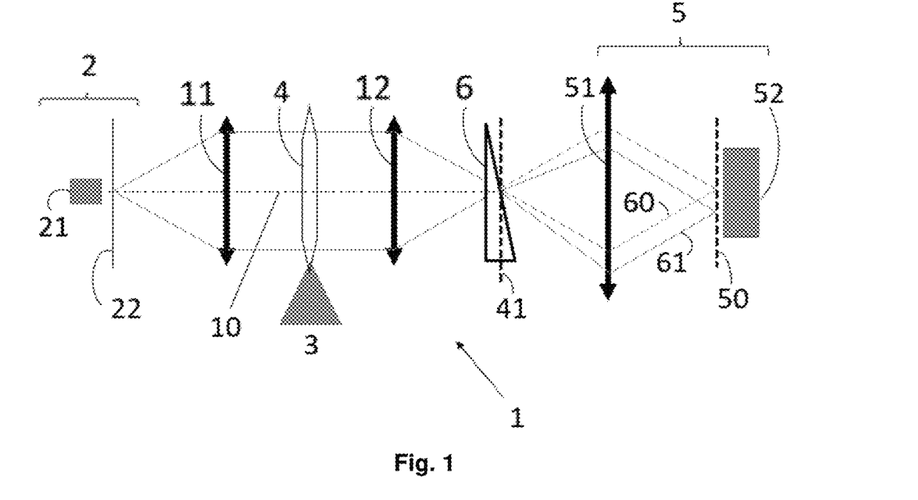
FIG. 1 shows a schematic figure of a first embodiment of a device for measuring the optical power according to the disclosure.

FIG. 1 shows a schematic figure of a first embodiment of a device 1 according to the disclosure. In it, the device comprises:
an optical object generator assembly 2, comprising a light source 21 and a mask 22 with a slit;
a support 3 for the optical test system;
a digital image detector 5;
a prism 6 located between the mask 22 and the digital image detector 5; and
processing means.

In this figure, as in other schematic figures, the position of the prism 6 is carried out for the purpose of positioning relative to the rest of the elements, but it does not suggest any particular shape or orientation.

The optical object generator assembly 2 generates an optical object, which is projected. When the optical test system is located in the support 3 and the optical object is generated, the optical test system projects an initial optical image 41 of the optical object along an optical axis 10. In this case, the optical test system is a test lens 4. In the particular case illustrated in FIG. 1, in the formation of this initial optical image 41, in addition to a test lens 4 placed on the support 3 thereof, a collimating lens 11 and a focusing lens 12 are placed on both sides of the test lens 4. In different embodiments, these elements may vary depending on the range of expected optical powers in the test lens 4. The important thing is that said test lens 4 projects the initial optical image 41, either alone or in combination with other optical elements, such as collimating lens 11 and focusing lens 12.

The prism 6 is intended to produce a lateral displacement in the initial optical image 41, when it is observed from the digital image detector 5, thereby generating a displaced optical image 61 and a reference optical image 60. The digital image detector 5 is positioned to capture the displaced optical image 61 and the reference optical image 60 in at least one digital image 50 containing data on the lateral displacement. This lateral displacement depends on the optical power of the test lens 4 and occurs without any movement of the system elements, in particular without any movement of the prism 6.

In this embodiment, the initial optical image 41 is formed on the prism 6. In other embodiments, the light is deflected before the initial optical image is formed and in other embodiments, afterwards, an optical image displaced by the prism 6 is also generated, without these alternative embodiments affecting the main technical effect produced by the measuring device 1.

In the embodiment shown in this figure, the prism 6 is removable, so that when the prism 6 is between the test lens 4 and the digital image detector 5, the digital image detector 5 captures a digital image with data from the displaced optical image 61, and when the prism 6 is extracted, the digital image detector captures another digital image with data from the reference optical image 60.

The digital image detector 5 comprises in this case a photographic lens 51 and an image sensor 52 in which the digital image is captured.

The processing means calculate the optical power of the test lens 4 from data on the lateral displacement contained in the digital image. In the event that the test lens 4 is an opto-adjustable lens, which varies the optical power thereof as a function of an electrical input signal (such as the rectangular periodic signal shown by a thin line in FIG. 7), displaced optical images are successively created in other lateral positions, one for each optical power (not shown in the figure).

Figure 2:
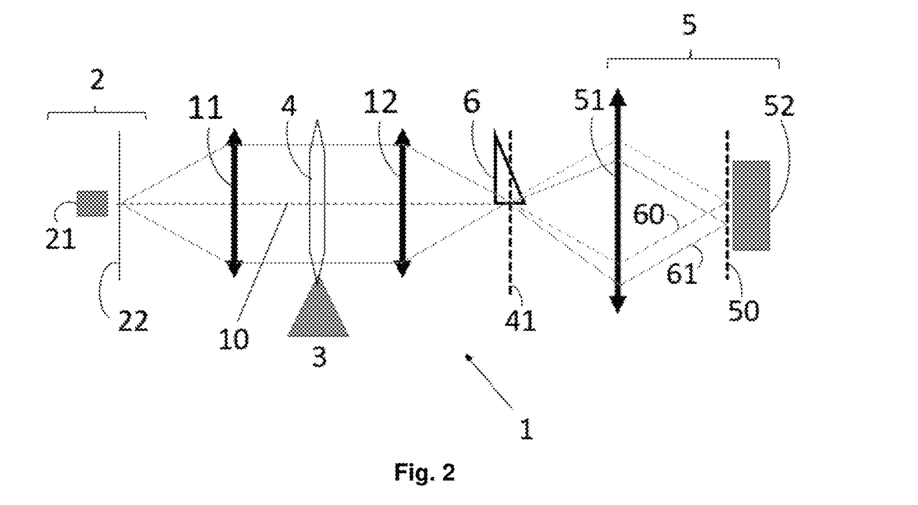
FIG. 2 shows a schematic figure of a second embodiment of a device for measuring the optical power according to the disclosure.

FIG. 2 shows an alternative embodiment of a device 1 for measuring the optical power of an optical test system, according to the disclosure.

In this case, as in the embodiment shown in FIG. 1, the deflector assembly comprises a single prism 6, but this is located to produce a lateral displacement only in one part of the initial optical image 41. The rest of the initial optical image 41 becomes a reference optical image 60, without being affected by any deflector element.

This is a simple way for the digital image detector 5 to capture a single image comprising the data of the displaced optical image 61 and the reference optical image 60, obtained simultaneously.

In other embodiments, the deflector assembly has two prisms, so that one of them is arranged to produce a lateral displacement only in part of the initial optical image, while another of them is arranged to produce a lateral displacement in a different part of the initial optical image.

In this way, the digital image detector receives a single digital image comprising data from two different images, each generated by one of the prisms. Each of these two images can be considered as reference optical image and displaced optical image, since the combination thereof contains the lateral displacement data, but at the same time they are referenced to each other.

Strategies that capture displaced optical images and reference optical images in a single digital image compensate for errors due to the placement of the optical test system, the intrinsic misalignments of the test lens (especially if it is an opto-adjustable lens) and vibrations during the measurement. As the measurement errors mentioned affect both optical images, the simultaneous capture of both allows us to discount the influence of the error on the measurement.

Figure 3:
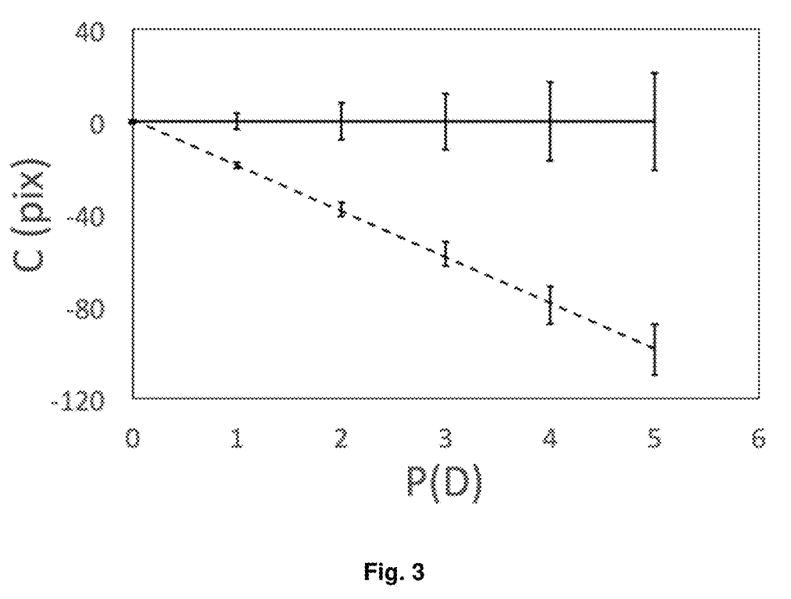
FIG. 3 shows data from computational simulations of the expected performance over a particular embodiment of the disclosure as shown in FIG. 1.

FIG. 3 illustrates how a particular embodiment of the disclosure works as shown in FIG. 1 and the numerical results provided by the precise computational simulation thereof.

Specifically, data on the reference optical image (the continuous line) and data on the displaced optical image (the dashed line) for different powers of the test lens are shown. On the X-axis, the optical power P of the optical test system is shown, in dioptres (D), and on the Y-axis the centre position of the optical image C, measured in pixels (pix), is shown. Error bars represent the widening of the optical image in pixel units of the detector, assuming that the illuminated object is ideally narrow (a point, a line or a slit).

The reference optical image, taken without a prism, shown as a continuous line, always remains in the same position, and the image is widened by defocussed blurring (as indicated by the error bars) as the optical power P of the optical test system increases.

In the presence of the prism, the displaced optical image, shown as a dashed line, widens in a similar way, but a downward slope occurs, a lateral displacement in its position, as the optical power P of the optical test system increases.

As the optical power of the test system increases, the widening increases, but this only affects the measurement in a secondary manner, since the measurement is based on the relative position of the displaced optical image with respect to the reference optical image. Without a deflector assembly, there is no lateral displacement, but with a deflector assembly, a displacement occurs that measures the optical power of the optical test system, also in the presence of blurring caused by defocussing which leads to widening of the optical images.

In practice, when an absolute displacement measurement algorithm is used, without taking a reference optical image, the system is not very robust, since the position of the displaced optical image is very sensitive to the centring of the optical test system and also to vibrations or small misalignments of the measuring device. However, in the case at hand, by capturing a reference optical image together with the displaced optical image, this condition is eliminated, and the system is more robust.

Figure 4A:
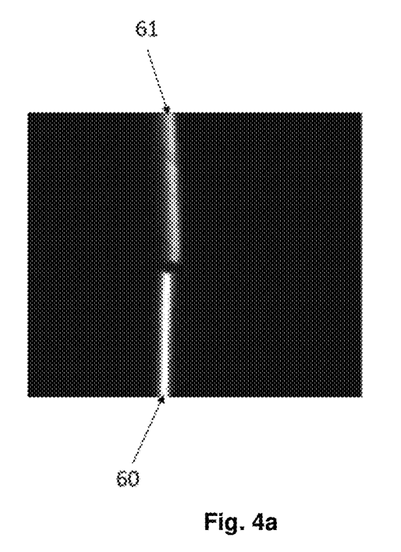
FIGS. 4a and 4b show digital images obtained by a particular embodiment of the disclosure.
Figure 4B:
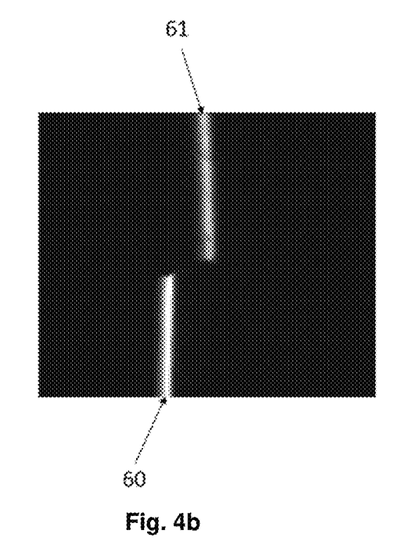

Two examples of digital images for a particular configuration of the measuring device of the disclosure are shown in FIGS. 4a and 4b.

In this case, the optical object is an optical slit-shaped light line, the optical object generator comprising a groove in an opaque plate illuminated from behind by an extensive LED.

The deflector assembly used in this case comprises a prism that affects only half of the initial optical image, corresponding to the upper half of the images. The rest of the initial optical image is unchanged, thus becoming the reference optical image, being the bottom of the images. In this case, therefore, the displaced optical image and the reference optical image are captured simultaneously and in the same digital image, although in other embodiments this capture can be made in different digital images.

FIG. 4a shows the digital image containing the data on the reference optical image 60 and the optical image displaced by the prism 61, in a case wherein the optical test system has low optical power and therefore produces little lateral displacement. FIG. 4b shows a similar digital image, but captured when the optical test system has a higher optical power, thus producing a higher lateral displacement. The reference optical image 60, captured at the lower portion of the digital image, does not change its position despite the change in the optical power of the optical test system, due to the fact that the light that forms does not pass through the prism. However, the displaced optical image 61 undergoes a lateral displacement that depends on the optical power of the optical test system. The reference is stable and compensates for possible irregularities, misalignments and vibrations to which the measuring device is subjected.

In this particular case, the optical test system is an opto-adjustable lens with variable focus on both digital images, and the camera is a high-speed camera capable of capturing 3500 images per second, and therefore, as seen in digital images, capable of capturing the lateral displacement of the optical image of the slit as the opto-adjustable lens changes its optical power. Between the images of FIGS. 4a and 4b, only 5 milliseconds have passed, but the system object of the disclosure is capable of recording changes in optical power with the same accuracy as if it were a fixed lens.

In other cases, such as, for example, the case in which the deflector assembly comprises two differently oriented prisms, the lower portion of the image does not remain unchanged, but rather it is the difference in movement between the two slits that gives the processing means the data necessary to calculate the optical power. In that case, either of the two could be considered as a displaced optical image or as a reference optical image. Obviously, the processing means base their calculation on a relationship between lateral displacement and optical power that is different from the previous case.

Different optical objects are used in difference embodiments, such as a cross, a point, a circle, a square, or a semi-space, with any of the orientations, inclinations, positions or possible sizes. In each case, the processing means would have to be changed to extract the lateral displacement from the digital image.

Figure 5:
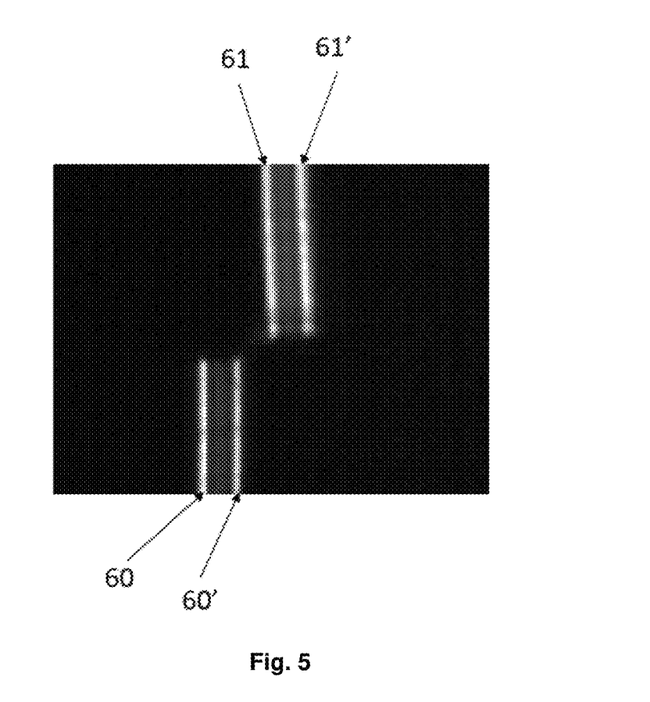
FIG. 5 shows a digital image obtained by another particular embodiment of the disclosure.

The advantages of using a high-speed digital image detector have been seen. However, one of the advantages of the present disclosure is that it allows the dynamic response of the opto-adjustable lens to be evaluated even with conventional low-speed, low-cost cameras. This is shown in FIG. 5.

In this figure, although it may not appear to the naked eye, the optical object is a simple slit, as in the case of FIGS. 4a and 4b.

The optical test system is an opto-adjustable lens, which varies its optical power at high speed, alternating every 10 ms between two optical powers with 3 dioptres of difference between them.

The deflector assembly comprises two prisms with the same dioptres, but one of them has the base of the prism in a direction opposite to that of the other. Each of the two prisms occupies half of the section corresponding to the initial optical image.

The digital image detector is a low-speed camera, which takes an image every 200 ms, meaning each digital image comprises 10 complete cycles of the opto-adjustable lens: the lens has changed 20 times of optical power between the time the camera takes one image and it takes the next.

What is observed in the digital image of FIG. 5 is the recording of the lateral displacements between which the optical images have oscillated during the entire 10 cycles of the opto-adjustable lens. It is observed that the slit of the lower portion of the image is divided into two slits of light 60, 60', corresponding to what we can call optical reference image and the slit of the upper portion is split into two slits of light 61, 61', corresponding to what we can call displaced optical image. As both the slit of the upper portion and the slit of the lower portion have been displaced, but in the opposite direction, either of them can be considered as an optical reference image, and the other, an optical image displaced with respect to the optical reference image. Within each of them, each of the slits of light observed corresponds to the ends between which these images oscillate.

If this low-speed camera were integrated in the optical power measuring devices known to the person skilled in the art, it would be totally inadequate to measure the variation of the optical power of said opto-adjustable lens.

However, the digital image of FIG. 5 enables the observation and measurement of the energy integrated in the time corresponding to each optical power of the opto-adjustable lens and, therefore, to know the path that the slit has followed when it moved, and compare it with the ideal path, which enables the observation of the dynamic effects of the lens. It enables checking if, when the lens operates at high speed, the lateral displacement is the same as when it operates at low speed or if, on the contrary, the lens responds with a jump in smaller or greater dioptres. It also allows checking the loss of energy in intermediate positions of optical power, corresponding to the duration of the transition between optical power levels.

The digital image provided by a low-speed camera, which shows an integrated response in time, does not provide such detailed information on the dynamic behaviour of the optical test system as that provided by the high-speed camera, which shows a time-discriminated response. However, it provides sufficient information for a large number of applications, especially for checking the correct operation of the opto-adjustable lens or of optical systems or instruments containing an opto-adjustable lens as a technological core and critical element. For example, in the case of simultaneous vision simulators by temporal multiplexing.

Figure 6:
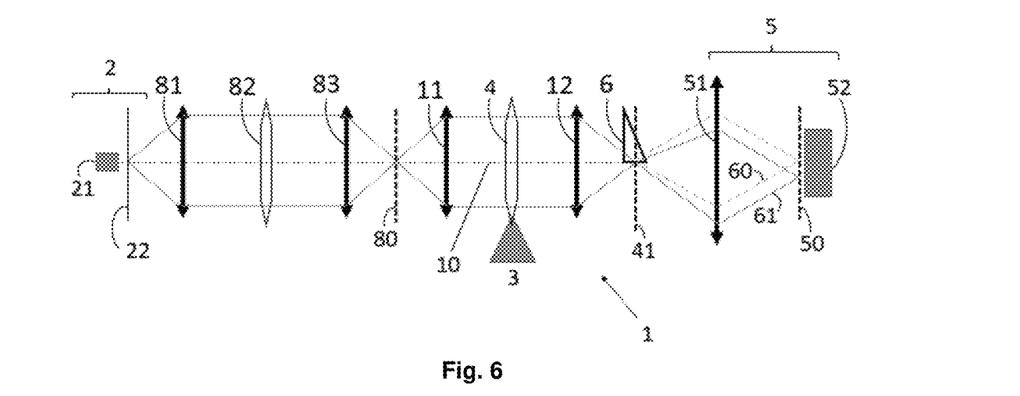
FIG. 6 shows a schematic figure of another embodiment of a device for measuring the optical power according to the disclosure.

In particular embodiments, with that illustrated in FIG. 6, the device additionally incorporates a calibration system.

As mentioned above, the device of the disclosure measures the lateral displacement of the displaced optical image with respect to the reference optical image. Since there is an unequivocal relationship between the lateral displacement and the optical power of the optical test system, said optical power can be measured by simply measuring the lateral displacement. An example of this is FIG. 3, obtained from simulations, which shows a linear relationship between pixel displacement and optical power.

This linear relationship can be estimated from the nominal values of the components used (optical powers of the lenses, spacing between elements, etc.). However, there is the disadvantage that these nominal values do not always coincide with the real values of the magnitudes of the elements and relationships that make up the device, meaning that estimate may not be as accurate as is needed. An option to overcome this drawback is to perform a prior calibration of the device by experimentally establishing said relationship between lateral displacement and optical power, for example, measuring lenses of known optical powers, called test lenses, and measuring the lateral displacement they generate. This draws the calibration curve (which is normally a straight line, since simulations predict a linear dependence) that provides the conversion table between lateral displacement versus optical power that will be used in subsequent measurements.

Said test lenses occupy the space of the optical test system and must be adapted to the pre-existing support. Therefore, in some particular embodiments, such as that shown in FIG. 6, a calibration system is incorporated in the measuring device 1 to be able to measure the optical test system in the presence of test lenses.

The optical object is projected along an optical axis 10 by the optical object generating system 2 into an optical calibration object 80 due to a calibration system 8 formed by a collimating calibration lens 81, a main calibration lens 82 and a focusing calibration lens 83. The main calibration lens 82 is located between the collimating calibration lens 81 and the focusing calibration lens 83, in a plane optically conjugated with the plane of the support 3 in which the optical test system 4 is placed. This makes both planes equivalent and adds the optical effect of the main calibration lens 82 to that of the optical test system 4.

This calibration system has several applications.

A first application is to perform calibrations, with the advantage that calibration lenses are always available, and it is not necessary to modify the structure of the measuring device to introduce them. In addition, having its own defined space does not affect the environment of the support 3 in which the optical test system 4 is located.

In addition, the calibration lenses 81, 82, 83 can be used to add or subtract dioptres and change the range in which measurements are made (if the power of the optical test system is too high or too low) thus extending the possibilities of the measuring device.

In the case of opto-adjustable lenses, a particular use is to calibrate the electrical signal that causes a certain desired response in terms of optical power. For this, the opto-adjustable lens is used as an optical test system 4 and a main calibration lens 82 is used with the same optical power as the optical power that is desired to be caused in the opto-adjustable lens, but of the opposite sign. Both lenses 4, 82 located in the measuring device, the electrical signal that feeds the opto-adjustable lens is varied until the optical power of the opto-adjustable lens compensates for the optical power of the test lens, which is observed when lateral displacement observed in the digital image, which combines that induced by the opto-adjustable lens 4 and the main calibration lens 82, is equal to zero.

Figure 7:
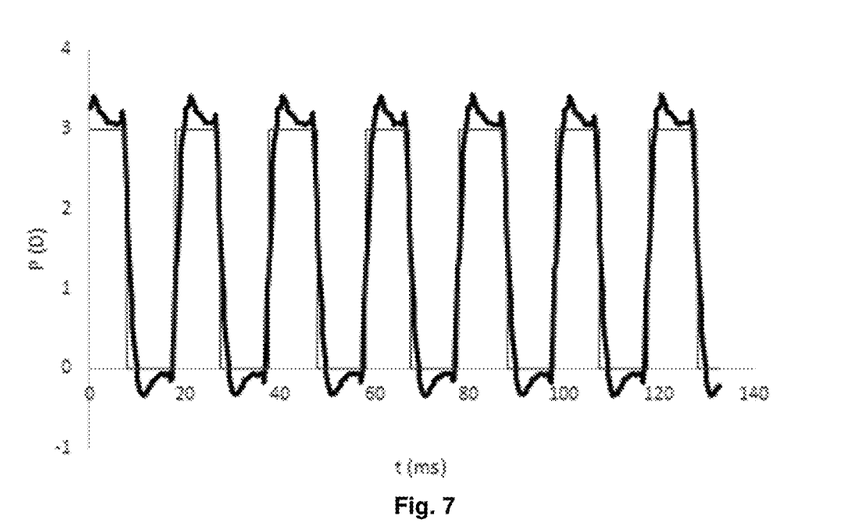
FIG. 7 shows a comparative graph between an ideal response of an optical test system and the actual response.
Figure 9:
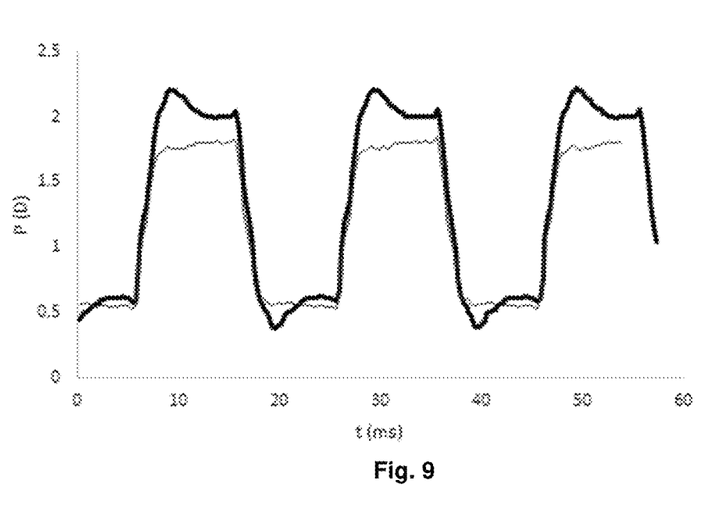
FIG. 9 shows a comparative graph between the actual response of the optical test system and the actual compensated response when the input signal is corrected.

Another of the applications can be seen in FIGS. 7 and 9.

FIG. 7 shows a comparison between an ideal response (thin line) of an opto-adjustable lens to a rectangular input signal with a 20 ms period and the response that is actually obtained (thick line), as a result of the dynamic effects on the variation of the optical power of the lens.

Ideally, the lens would be expected to vary the value of its optical power completely instantaneously: compared to a rectangular input signal that varies between two different values, the optical power is expected to follow the same scheme, varying instantaneously between two values of nominal, upper and lower optical power.

However, what is observed in the measurement of the real optical power, represented by the thick line, is that there are dynamic effects that make it so the actual optical power output does not correspond exactly to that ideally expected. The optical power shows a peak with respect to the nominal value when the change in the input signal occurs. The peak is higher than the higher nominal value when the signal increases in intensity and lower than the lower nominal value when the signal changes to its lower value.

Figure 8:
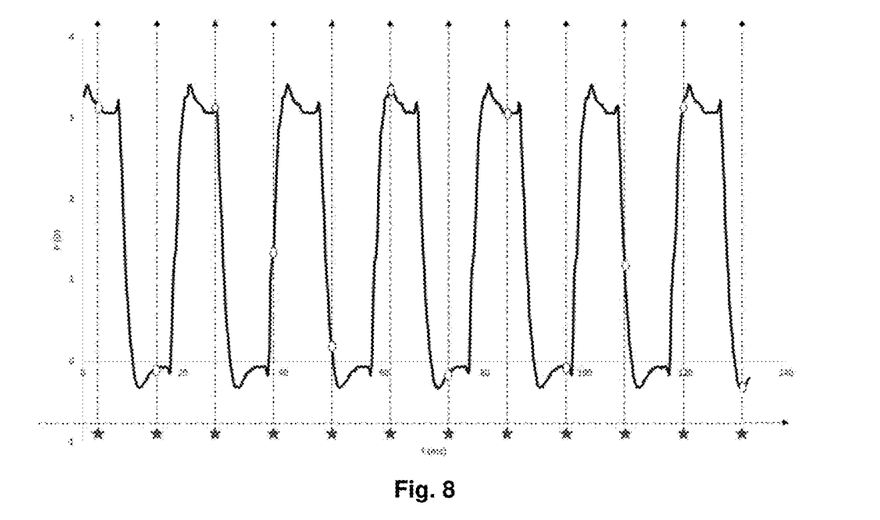
FIG. 8 shows the operation of the disclosure for the case in which a pulsed light source and a low-speed camera are used, using the graph of FIG. 7.

As indicated, FIG. 8 shows the operation of the disclosure for the case wherein a pulsed light source and a low-speed camera are used. As in the case shown in the graph of FIG. 7, the thick line represents the response signal of a lens (e.g. an opto-adjustable lens) that is actually obtained by applying the rectangular input signal with a 20 ms period of FIG. 7.

In the case shown in FIG. 8, the characterisation of this periodic response signal does not require the use of a high-speed camera (although a high-speed camera could also be used). In this case, the periodic response signal can be characterised using an optical object generator assembly that generates very short light pulses (typically less than 1 ms), the duration of the light pulse being much shorter than the period of the periodic response signal. These light pulses are shown on the coordinate axis by stars. The image generated by a light pulse is captured by the digital image detector, which can be a low-speed camera, and which is synchronised with the generation of light pulses by the optical generator. The low-speed camera captures are shown in FIG. 8 by white dots.

In this embodiment, the capture rate is such that the same capture is prevented from containing information relating to more than one pulse of light. Therefore, the capture of the information related to a pulse is completed before another pulse strikes.

However, it is also possible for there to be two or more pulses for each capture of the digital image detector. In this case, the pulses registered by the detector must be temporarily discernible by means of one or more pulse characteristics, such as the intensity of each pulse, its duration, its shape, etc.

Subsequently, these captures can be processed to reconstruct a cycle of the periodic response signal, that is, of optical power. For this reconstruction to be possible, the frequency of the input signal cannot be an integer multiple of the frequency of the light pulses, since to reconstruct a cycle of a cyclic signal it is necessary to know several values that the signal takes in the same cycle.

In a specific embodiment, the periodic input signal is a rectangular signal with a 50 Hz frequency, and the capture frequency of the digital image detector is equal to the pulse generation frequency of the optical object generator and equal to 30 Hz.

In this embodiment, the result is shown for a rectangular input signal, but it would also be applicable provided that the optical power signal to be characterised is cyclic (all cycles are equal). In this way, each image captured with the low-speed camera corresponds to a point in the cycle of the optical power signal (point of temporal dimension equal to the duration of the light pulse). The set of all the images taken allows the entire cycle to be sampled.

FIG. 9 shows the comparison between said real response of the opto-adjustable lens (thick line) and a compensated real response (thin line) when the input signal is corrected to compensate for dynamic effects, thanks to the data obtained in a measuring device according to the disclosure.

The measuring device according to the disclosure offers the precision necessary to characterise the dynamic response, and therefore provides the technician with the information he needs to vary the input signal and obtain much more uniform optical output power values, without the peaks or other distortions that were observed when the signal had not been modified. As seen in the compensated real response, represented by the thin line, there are no aforementioned peaks, so the dynamic behaviour of the opto-adjustable lens is much more similar to the ideal.

The invention claimed is:

1. A device for determining an optical power of an optical test system, wherein the device comprises:
   an optical object generator assembly configured for generating an optical object along an optical axis;
   a support for the optical test system, such that when the optical test system is located on the support, said optical test system is aligned with the optical axis, and when the optical object is generated, the optical test system projects an initial optical image of the optical object;
   a digital image detector;
   a deflector assembly located between the optical object generator assembly and the digital image detector to produce a lateral displacement in at least one part of the initial optical image, thus generating a displaced optical image and a reference optical image,
   the digital image detector being located to capture the displaced optical image and the reference optical image in at least one digital image containing data on the lateral displacement;
   processing means for determining the optical power of the optical test system from the lateral displacement data contained in the digital image; and
   a calibration system between the optical object generator assembly and the support for the optical test system, said calibration system comprising a collimating calibration lens, a focusing calibration lens and a main calibration lens located between them in a plane optically conjugated with the plane of the support for the optical test system.

2. The device of claim 1, wherein the optical object is an optical slit-shaped light line.

3. The device of claim 1, wherein the support comprises a reel, an assembly line, a revolver or a drum with a plurality of individual supports.

4. The device of claim 1, wherein the support is adapted to be positioned in a plurality of different positions, such that in each of the plurality of different positions, an individual support is located such that when an optical test system is located on the individual support, the optical test system is aligned with the optical axis.

5. The device of claim 1, wherein the deflector assembly comprises a single deflector element from among the following: a prism, a mirror, a partially reflective surface, a diffraction grating, a spatial light modulator, a network of microprisms, and a network of micromirrors.

6. The device of claim 5, wherein the single deflector element is arranged to produce a lateral displacement only in part of the initial optical image.

7. The device of claim 1, wherein the deflector assembly comprises a plurality of deflector elements.

8. The device of claim 7, wherein one of the deflector elements is arranged to produce a lateral displacement only in part of the initial optical image, while another of the deflector elements is arranged to produce a lateral displacement in one part other than the initial optical image.

9. The device of claim 1, wherein the optical test system operates with a frequency of optical power change, and the digital image detector has a capture frequency lower than the frequency of optical power change of the optical test system.

10. The device of claim 1, further comprising optical elements, such as a collimating lens or a focusing lens, located on both sides of the optical test system.

11. The device of claim 1, wherein the optical object generator assembly is configured to generate the optical object in a pulsed manner over time.

12. The device according to claim 11, wherein the digital image detector comprises a camera that is synchronized with the optical object generator assembly.

13. A method to determine an optical power of an optical test system, the method including the following steps:
   generating an optical object with an optical object generator assembly;

providing the optical test system on a support such that the optical test system projects an initial optical image of the optical object;

providing a deflector assembly that produces a lateral displacement in at least one part of the initial optical image, generating a displaced optical image and a reference optical image;

capturing with a digital image detector at least one digital image containing data on the lateral displacement of the displaced optical image and on the reference optical image; and calculating by means of processing means the optical power of the optical test system from the data on the lateral displacement of the displaced optical image and the reference optical image.

14. The method of claim 13, wherein the step of generating an optical object further includes generating an optical object in a pulsed manner over time.

15. The method of claim 14, wherein the step of capturing at least one digital image is performed with a low-speed camera synchronized with the generation of the optical object in a pulsed manner.

16. The method of claim 13, wherein the step of calculating the optical power of the optical test system further includes identifying a first group of pixels corresponding to the displaced optical image and a second group of pixels corresponding to the reference optical image, measuring the lateral displacement that separates both groups of pixels and correlating the lateral displacement with a measurement table that assigns an optical power value to each lateral displacement value.

17. The method of claim 13, wherein the optical test system comprises an opto-adjustable lens.

18. The method of claim 17, wherein the stage of capturing a digital image containing data on the lateral displacement of the displaced optical image is performed several times, the optical test system being subjected to a variable electrical signal, such that obtaining a relationship between the electrical signal supplied to the optical test system and the optical power that said optical test system provides for said electrical signal.

19. The method of claim 13, wherein the support comprises a reel, an assembly line, a revolver or a drum with a plurality of individual supports, the support being adapted to be positioned in a plurality of different positions, such that in each of these positions an individual support is located such that when an optical test system is located on the individual support, the optical test system is aligned with the optical axis and the method further includes the step of arranging a plurality of lenses in the support, such that data of the displaced optical image and data of the reference optical image is captured for each lens of the plurality of lenses, thus allowing the lenses to be checked, characterized and/or selected.

20. The method of claim 13, carried out by a device comprising:

an optical object generator assembly configured for generating an optical object along an optical axis;

a support for the optical test system, such that when the optical test system is located on the support, said optical test system is aligned with the optical axis, and when the optical object is generated, the optical test system projects an initial optical image of the optical object;

a digital image detector;

a deflector assembly located between the optical object generator assembly and the digital image detector, intended to produce a lateral displacement in at least one part of the initial optical image, thus generating a displaced optical image and a reference optical image, the digital image detector being located to capture the displaced optical image and the reference optical image in at least one digital image containing data on the lateral displacement; and processing means for determining the optical power of the optical test system from the lateral displacement data contained in the digital image.

21. The method according to claim 20, further comprising the step of calibrating the device by measuring or compensating the optical power induced by an optical test system for calibration.

* * * * *